(12) United States Patent
Haenisch et al.

(10) Patent No.: US 11,260,896 B2
(45) Date of Patent: Mar. 1, 2022

(54) STEERING COLUMN ASSEMBLY

(71) Applicant: TRW Automotive GmbH, Alfdorf (DE)

(72) Inventors: Stephan Haenisch, Essen (DE); Patrick Ericke, Dormagen (DE)

(73) Assignee: ZF Automotive Germany GmbH, Alfdorf (DE)

(*) Notice: Subject to any disclaimer, the term of this patent is extended or adjusted under 35 U.S.C. 154(b) by 94 days.

(21) Appl. No.: 16/610,941

(22) PCT Filed: May 15, 2018

(86) PCT No.: PCT/EP2018/062610
§ 371 (c)(1),
(2) Date: Nov. 5, 2019

(87) PCT Pub. No.: WO2018/210874
PCT Pub. Date: Nov. 22, 2018

(65) Prior Publication Data
US 2020/0079417 A1 Mar. 12, 2020

(30) Foreign Application Priority Data
May 18, 2017 (DE) .......................... 102017110868.8
Aug. 28, 2017 (DE) .......................... 202017105164.1

(51) Int. Cl.
*B62D 1/19* (2006.01)
(52) U.S. Cl.
CPC ............. *B62D 1/197* (2013.01); *B62D 1/192* (2013.01); *B62D 1/195* (2013.01)

(58) Field of Classification Search
CPC ........ B62D 1/197; B62D 1/192; B62D 1/195; B62D 1/19; F16F 7/125; F16F 7/123; F16F 7/128; F16F 7/12
See application file for complete search history.

(56) References Cited

U.S. PATENT DOCUMENTS

| | | | | | |
|---|---|---|---|---|---|
| 2,179,959 | A | * | 11/1939 | Schroedter | F16F 1/545 403/224 |
| 2,819,063 | A | * | 1/1958 | Neidhart | F16F 3/0876 267/292 |
| 3,699,824 | A | * | 10/1972 | Staudenmayer | B62D 1/192 74/492 |
| 3,943,793 | A | * | 3/1976 | Stedman | B62D 1/192 74/492 |

(Continued)

FOREIGN PATENT DOCUMENTS

| | | | | |
|---|---|---|---|---|
| DE | 2044905 A1 | * | 3/1971 | ............. B62D 1/192 |
| DE | 102012203183 A1 | * | 9/2013 | ............. B62D 1/192 |

(Continued)

*Primary Examiner* — Jonathan Ng
*Assistant Examiner* — Scott F. Underwood
(74) *Attorney, Agent, or Firm* — Robert James Harwood

(57) ABSTRACT

A steering column assembly for a vehicle, in particular a motor vehicle, provides that an absorption part extends into a reduction part through a passage, which has a smaller cross-section than an end portion of the absorption part having the form of a rod, tube or wire. By a relative movement between the reduction part and the absorption part the end portion is pulled through the passage and plastically deformed. In such a way, an energy absorption device is formed.

23 Claims, 16 Drawing Sheets

(56) References Cited

U.S. PATENT DOCUMENTS

| | | | | |
|---|---|---|---|---|
| 4,886,295 | A | * | 12/1989 | Browne ................. B62D 1/197 |
| | | | | 280/777 |
| 5,425,553 | A | | 6/1995 | Yazane et al. |
| 5,487,562 | A | * | 1/1996 | Hedderly .............. B60R 22/341 |
| | | | | 188/371 |
| 2001/0011486 | A1 | | 8/2001 | Glinowiecki et al. |
| 2003/0209915 | A1 | * | 11/2003 | Yoshida .................. B60R 19/34 |
| | | | | 293/133 |
| 2004/0011615 | A1 | | 1/2004 | Ray et al. |
| 2008/0174095 | A1 | * | 7/2008 | Ridgway ................ F16F 7/125 |
| | | | | 280/777 |
| 2019/0375445 | A1 | * | 12/2019 | Birkheim ............... B62D 1/192 |

FOREIGN PATENT DOCUMENTS

| | | | | |
|---|---|---|---|---|
| DE | 102014112065 A1 | * | 2/2016 | ........... E04H 9/0215 |
| FR | 2834958 A1 | | 7/2003 | |
| KR | 200172332 Y1 | * | 4/2000 | ............. B62D 1/192 |
| WO | WO-2004103796 A1 | * | 12/2004 | ............. B62D 1/192 |
| WO | WO-2017149042 A1 | * | 9/2017 | ............. B62D 1/192 |

\* cited by examiner

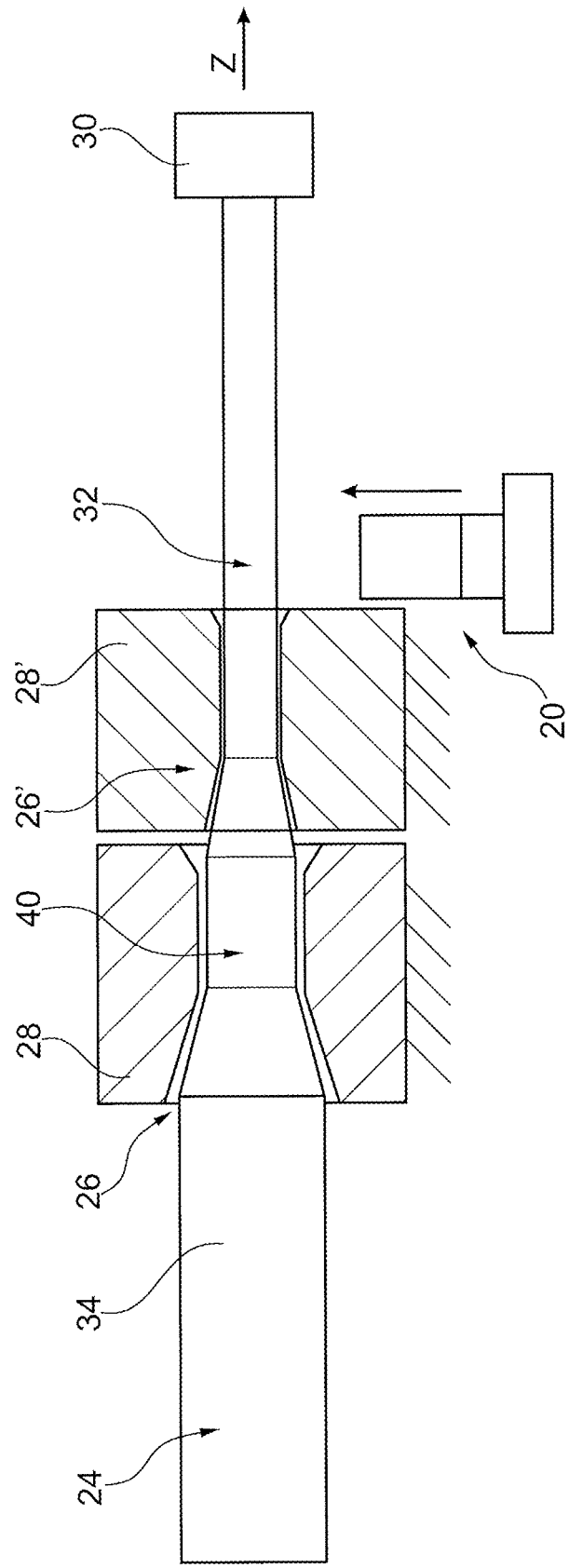

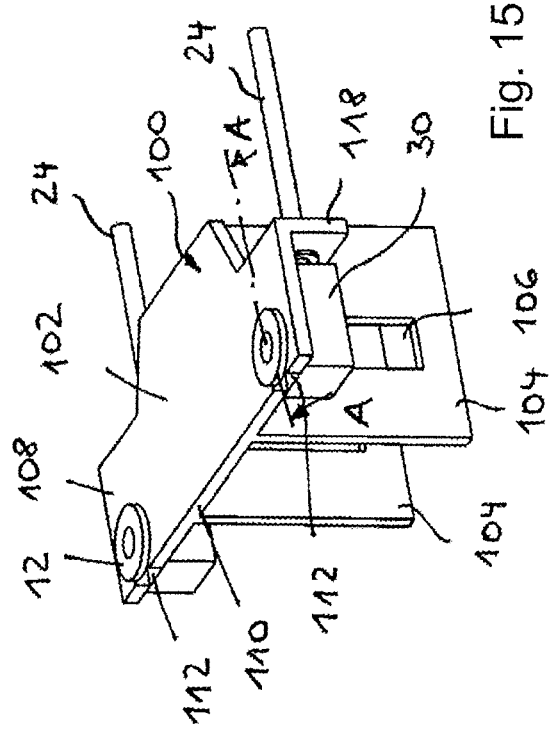
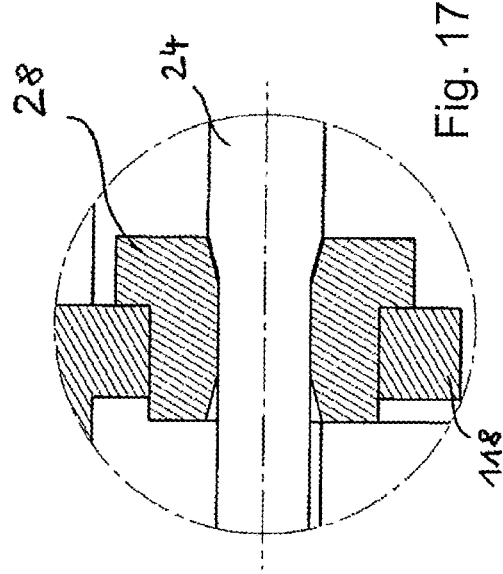
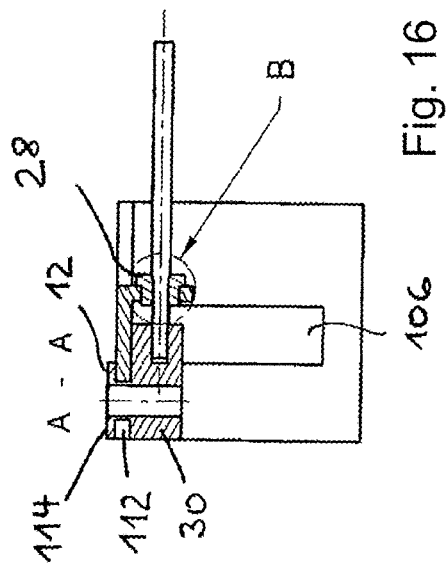

STEERING COLUMN ASSEMBLY

CROSS-REFERENCE TO RELATED APPLICATION

This application is a national stage of International Application No. PCT/EP2018/062610, filed May 15, 2018, the disclosure of which is incorporated herein by reference in its entirety, and which claimed priority to German Patent Application No. 102017110868.8, filed May 18, 2017, and German Patent Application No. 202017105164.1 filed Aug. 28, 2017, the disclosures of which are incorporated herein by reference in its entirety.

TECHNICAL HELD

The invention relates to a steering column assembly for a motor vehicle comprising an energy absorption device.

Steering column assemblies for vehicles with an energy absorption device are known. In the event of a vehicle crash the energy absorption device dampens the impact of the driver on the steering wheel as the steering column is shifted in the axial direction away from the driver into the instrument panel, and energy-absorbing components such as rolling straps or rolling tear straps absorb a part of the energy through plastic deformation.

Steering column assemblies comprising an energy absorption device are intended in particular for vehicles equipped with an airbag in the steering wheel, which in some countries may be driven without wearing a seat belt. In order to minimize a risk of injury, the energy absorption device needs to absorb a significant part of the forces acting on the driver when the driver hits the steering wheel or the airbag.

SUMMARY

The object of the invention is to build a steering column assembly comprising an energy absorption device, which is compact and has a very good energy absorption behavior. To achieve the object a steering column assembly for a vehicle, especially a motor vehicle, is provided, comprising: a vehicle-fixed mounting element and a sleeve element mounted thereon, with a steering shaft extending through the sleeve element and an energy absorption device. The energy absorption device is coupled to the mounting element and the sleeve element, and which has at least one elongate absorption part and at least one reduction part with a passage for the absorption part, through which the absorption part extends, and wherein said passage has a smaller cross-section than an end portion of the absorption part. In the event of a vehicle crash, at least the absorption part is fixedly coupled to either the mounting element or the sleeve element, while the reduction part is fixedly coupled to the other two elements. In the event of a vehicle crash, the mounting element and the sleeve element are coupled to each other in a longitudinally displaceable manner, so that a relative longitudinal movement between the absorption part and the reduction part may take place, wherein due to the longitudinal movement and due to an applied tensile force to the absorption part, the end portion is plastically deformed in cross-section through the smaller passage in cross-section.

While in the prior art the deformation elements have either been bent and/or torn, the present invention provides that at least one absorption part is pulled through a narrow section, in particular, the passage, and there it is plastically deformed, Due to this simple solution, in which an absorption part (in the radial direction) is pulled, preferably entirely, through a closed narrow section, the energy absorption device is constructed in an extremely simple and compact manner. Furthermore, as experiments have shown, the deformation effect is excellent, By relative movement is to be understood hereafter that either the absorption part is fixed and the reduction part is moved along the absorption part, or vice versa, the absorption part is moved and the reduction part is stationary.

There are two systems on the market, the so-called standard tube-in-tube concept with an outer movable tube to adjust the steering wheel (said tube hereinafter referred to as sleeve element) that supports the steering shaft in its interior. The locking of the assembly takes place by direct locking of the outer tube. A vehicle-fixed inner tube usually connected to the steering gear serves as a mounting element, in which the sleeve element is located. The second concept, the so-called inverted tube-in-tube concept, has an external mounting element having the form of a tube, into which the sleeve element extends and is displaceable in the outer tube. The clamping and locking while adjusting the steering wheel is performed via the outer tube in this case. The invention relates to both systems, even if only the inverted tube-in-tube concept is illustrated in the following figures.

Given that at least one absorption part is subjected to tensile stresses, it may be sufficient to retain said absorption part at one end, wherein the opposite end associated with the end portion must not be mounted. At least the end portion of the absorption part, but preferably the entire absorption part may extend exclusively linearly in the direction of the longitudinal movement. Thus, no deflection requiring lateral space is provided. The at least one absorption part is extending linearly before and after a vehicle crash. It is particularly advantageous if the at least one absorption part extends parallel to the longitudinal extension of the sleeve element, for example, on the outer side.

The passage may be formed preferably by one entirely closed matrix or a plurality of projections which are extending in direction of a central axis of the absorption part or rollers. The matrix may abut against the entire outer circumference or peripheral portions of the absorption part, wherein alternatively projections or rollers abut against portions of the absorption part which penetrate into the absorption part along said portions in the event of a vehicle crash.

In order that the absorption part is not torn and in order that no excessive tension arises when the movement process begins, the passage is narrowed in the direction of movement laterally or radially to the absorption part, seen continuously in the direction of its retaining portion opposing the end portion. Here, in cross-section conical profiles of the passage or arcuate cross-sectional profiles may be implemented. If necessary, the absorption part itself may be constructed in a manner that it exhibits different cross-sections or material properties in the end portion, in order to enable an adaptation of the force-path curve.

In order to easily assemble the absorption part, it is advantageous if the absorption part in the initial state, i.e. before a vehicle crash, has a cross-section from the support end opposing the end portion at least up to the passage, said cross-section allowing movement through the passage without plastic deformation. This means that the absorption part has different cross-sections from the beginning. The support end with the thin cross-section may be guided through the passage for the assembly without deformation. Preferably, the transition between the two sections is achieved in a tapered manner in order to avoid abrupt cross-sectional jumps.

The term energy absorption requirement is a requirement that is determined by external parameters, for example, by the mass of the driver, whether the driver is wearing a seat belt or not, the current vehicle speed and/or the deceleration during a vehicle crash. In other words, the energy absorption requirement specifies the expected amount of energy that needs to be absorbed during a vehicle crash in order to cushion the driver in the best possible way.

One embodiment of the invention provides that the steering column assembly may achieve various absorption levels to adapt the absorption of different crash situations. For this purpose, it is provided at least one absorption part and two passages in the case of a serial arrangement, and at least two absorption parts and two passages in the case of a parallel arrangement, and in both cases, one coupling device which is designed in a manner that in the event of a first energy absorption requirement, only a first passage is movable relative to the associated absorption part(s) in order to absorb energy, and that in the event of a second higher energy absorption requirement a second passage is movable relative to the associated absorption part(s) in order to absorb energy. Consequently, depending on the crash situation the coupling device switches between different energy absorption levels. Thus, in the event of a low energy absorption requirement only one absorption element is plastically deformed, and in the event of a high energy requirement, additionally (or instead) a further absorption element is plastically deformed. There may be provided a plurality of first identical absorption parts, preferably in cross-section, with associated identical first passages, preferably in cross-section. This means that these first absorption parts are effective in the event of the first energy absorption requirement. They may be connected in parallel, i.e. they operate simultaneously.

To reduce the number of absorption parts, at least two passages for only one absorption part may be provided. The cross-section of the passages is increasingly reduced from passage to passage up to the end portion. This means that the passage close to the end portion has a smaller cross-section than a remote passage and, if present, an even more remote passage, etc.

In a structurally simple embodiment, the coupling device is designed in a manner that the first passage also in the event of the second energy absorption requirement is movable relative to the associated absorption part in order to absorb energy. Again, as before, the relative mobility is to be understood so that either the passage or the absorption part is movable and the other part remains stationary. In this embodiment, the second passage is engaged to the first passage. When the relative movement takes place between the absorption part and two successively arranged, active, i.e. engaged passages, then a portion of the absorption part may be pulled through both passages to be gradually deformed in increasingly smaller cross-sections.

Optionally, one of the two passages associated to the same absorption part may be functionally connected by means of a coupling device only in the event of a predetermined energy absorption requirement. This occurs particularly in the event of the second energy absorption requirement.

In general, it should be stressed that, of course, a third or higher energy absorption requirements are possible with a corresponding number of engageable or disengageable passages. This allows that the required energy to be absorbed will be even more finely adjusted to the crash situations.

In addition, the energy absorption device presented here may also be combined with conventional energy absorption systems to operate according to different energy requirements. In this case, for example, an engageable tear-bending plate for additional energy absorption is possible, which is mechanically engageable.

In order to timely engage or disengage a passage in a vehicle crash, the coupling device has a fast-response drive, in particular a pyrotechnic drive. Of course, other types of drive could be used. It is also possible to activate an electric drive even while driving, for example when driving very fast. In such a situation a higher energy absorption requirement will always be present. The same may be necessary, for example, with very large, heavy passengers while driving at medium speeds.

Alternatively, or in addition to the variant with two passages associated with a common absorption part, the coupling device may be connected to a second reduction part comprising the second passage. The coupling device may either mechanically uncouple the first and second reduction part from each other in the event of the first energy absorption requirement or mechanically couple said parts in the event of the second energy absorption requirement. Given that the reduction parts are coupled together, they are designed either jointly stationary or jointly movable. Consequently, only one reduction part must be either movable or stationary, while the second reduction part is coupled via the coupling device depending on the energy absorption requirement of the first reduction part. This coupling may be achieved by an intermediate element that optionally connects both reduction parts, or by displacement of one reduction part towards the other. In the latter case, a positive form-fitting connection between the two reduction parts is achieved, for example, by using a toothing and a counter-toothing on the reduction parts.

The steering column assembly according to the invention may also be implemented with a steering column adjustment. In this case, a locking mechanism fixed to the vehicle is provided in a mechanical steering column adjustment. The locking mechanism has a locking position and an unlocking position. In the unlocking position the energy absorption device is displaceable together with the steering shaft, and in the locking position at least one reduction part or at least one absorption part is secured by the locking mechanism itself fixedly to the vehicle.

An electric steering column adjustment preferably pushes the reduction part directly, and as a result of this, also pushes the sleeve element. For example, a gear driven by an electric motor comprising a toothing for engagement on the reduction part is presented here. All absorption parts may extend parallel to each other and/or be secured to a longitudinal end of the same support member. This design is very compact.

The absorption part or the absorption parts may be mounted on a linear guidance, for example, on the support member. Alternatively, the reduction part is or the reduction parts are mounted on a linear guidance to be displaced along the absorption part or the absorption parts.

The plurality of absorption parts should, in particular, extend parallel to the steering shaft. The fact that the energy absorption device is positioned on the outside of the mounting element saves space. At least one absorption part may be a rod, a tube or a wire-like object. Preferably the absorption part has a circular cross-section. Other cross-sections are also possible. Materials used for absorption and reduction parts include metals in particular.

In one embodiment of the invention, the at least one reduction part is fixedly coupled to the sleeve element, and the at least one absorption part is fixedly coupled to the mounting element, in a manner that in the event of a vehicle crash the reduction part is moved along the at least one stationary absorption part, while the absorption part is plastically deformed in cross-section.

Another embodiment provides that the cross-section of the passage is adjustable in a variable manner. The deformation of the absorption part may thus be adjusted very well to the energy to be absorbed.

In a so-called standard tube-in-tube concept, the sleeve element is preferably received in a releasable and lockable clamping unit. In the released state, the sleeve element is adjustable axially and in height, relative to the clamping unit jointly with the steering shaft. In this case, the sleeve element is not directly coupled to the mounting element, but via the clamping unit.

In a vehicle crash, the clamping unit together with the sleeve element is displaced relative to the mounting element. This leads to a relative movement between the clamping unit and the mounting element, and due to this relative movement, the reduction part is displaced relative to the absorption part.

One embodiment provides in this respect that the reduction part is provided in the damping unit, in this case as a separate part, or that the reduction part is integrated as one piece into the clamping unit. Of course, vice versa, the reduction part may also be fixed, and the absorption part may be moved in the event of a crash. Then, the absorption part is connected to the clamping unit via a support member for fixing the absorption part. The reduction part is in this case coupled to the support member directly or indirectly or becomes an integral part or a one-piece component thereof.

If in the event of a crash, the clamping unit is moved away relative to the mounting element, said clamping unit might possibly come out from the fixation formed by the mounting element. In the following movement, the clamping unit and also the sleeve element as well as the steering shaft are guided by fasteners. In order to improve the support of the clamping unit and the sleeve element, preferably a plurality of parallel absorption parts are provided.

The mounting element or the mounting elements may also form a kind of guide or at least a temporary guide, wherein the clamping unit has at least one slit, through which one associated mounting element extends. Along the slit, the clamping unit may move relative to the mounting element.

In order to require as few parts as possible, a support member for the absorption part may be connected to the mounting part below the slit, so that the clamping unit is located on the support member. The support member has, in this way, a double function.

In a structurally simple and advantageous embodiment, the clamping unit comprises an upper plate to which the mounting element, in particular the plurality of mounting elements, are engaged. Webs projecting downwardly from the underside of the plate are spaced-apart from each other, with the sleeve element being received between said webs. The distance between the webs may for example be changed by a quick-release lock in order to achieve the released and the locked state. For optimum support, the upper plate may protrude laterally from the webs. This means there are projecting portions in opposite directions. On each portion at least one mounting element may be engaged, which improves the stability of the entire support.

The clamping unit may be fastened directly to the vehicle via the mounting element, or indirectly via an intermediate fastening element, such as a fastening plate. To this fastening plate the mounting element or the mounting elements are then fastened, and the fastening plate itself is finally mounted fixedly on the vehicle.

BRIEF DESCRIPTION OF THE FIGURES

Further advantages and features of the invention will become apparent from the following description and the drawings to which reference is made. Shown by the drawings:

FIG. 4c shows a schematic representation of the energy absorption device according to the third embodiment in the event of a high force requirement or energy absorption requirement, FIG. 15 shows a further embodiment of the steering column assembly according to the invention, wherein a clamping unit and an energy absorption device are illustrated here.

FIG. 16 shows a sectional view along line A-A in FIG. 15,

FIG. 17 shows an enlarged view of the area designated with B, framed in FIG. 16 with a separate reduction part.

DETAILED DESCRIPTION

Figure 1:
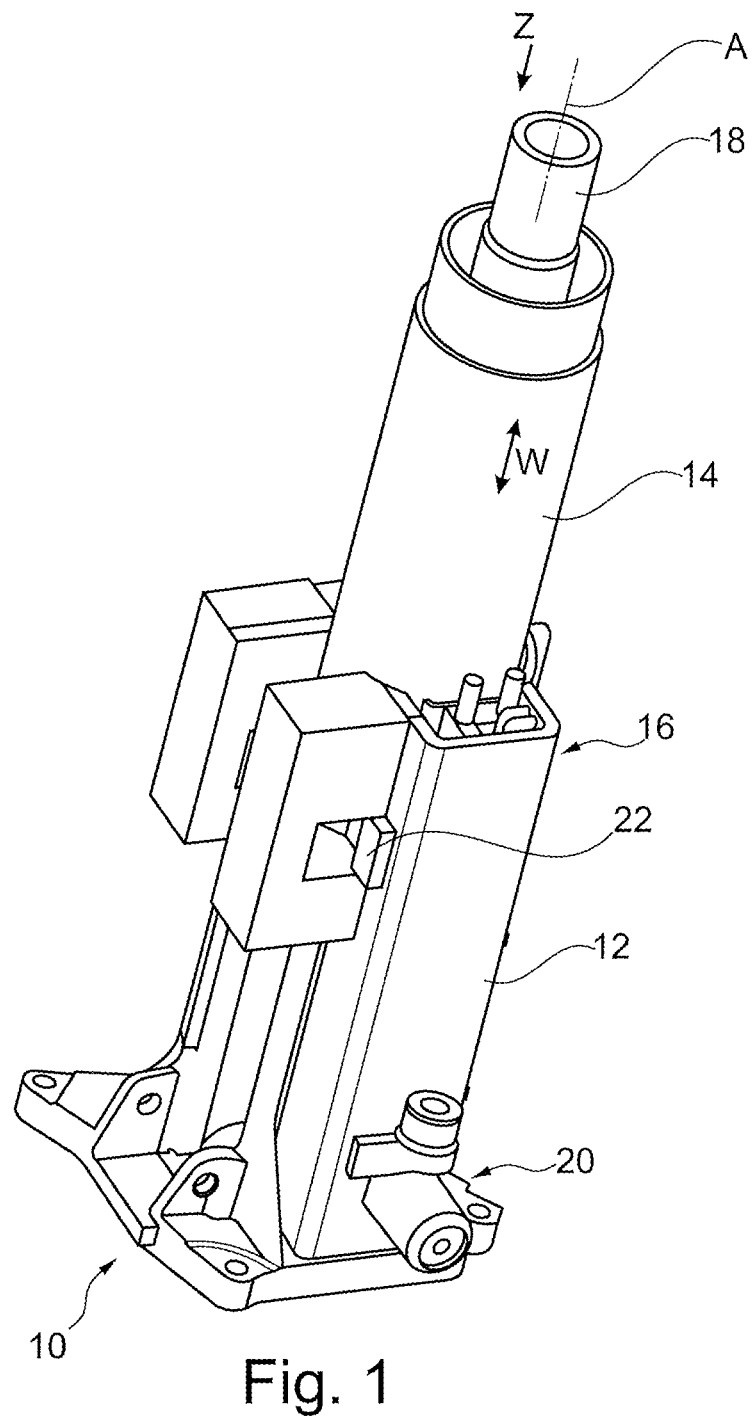
FIG. 1 shows a schematic representation of an embodiment of the steering column assembly for a vehicle, according to the invention.

FIG. 1 shows a steering column assembly 10 for a vehicle, in particular a motor vehicle such as a passenger car, comprising a mounting element 12, a sleeve element 14 and an energy absorption device 16. The sleeve element 14 is received in the vehicle-fixed mounting element 12 and mounted so as to be displaceable in the axial direction Z of the sleeve element 14, relative to the mounting element 12. Then, for example, a steering wheel may be adjusted in the axial direction Z, said steering wheel being arranged opposite to the mounting element 12. The sleeve element 14 forms a housing for a steering shaft 18, which is mounted in the sleeve element 14 so as to be rotatable about the axis A and is axially adjustable together with it for steering wheel adjustment. The energy absorption device 16 is arranged radially on the outside of the mounting element 12 and is firmly connected thereto. The mounting element 12 is firmly connected to the chassis of the motor vehicle by means of a carrier (not illustrated) and thus firmly installed in the vehicle.

The mounting element 12 further comprises a coupling device 20, which will be explained in more detail in the following, of which only one drive in FIG. 1 may be seen, as well as a locking mechanism 22 for locking the sleeve element 14. This makes possible that, in an opened locking mechanism 22, the sleeve element 14 is displaceable within the mounting element 12 in the axial direction Z in order to adjust the sleeve element 14 together with the steering shaft 18 and steering wheel. After the adjustment, the locking mechanism 22 is set to the closed position, in which the sleeve element 14 is fixed in place in the axial direction Z into the mounting element 12.

Figure 2:
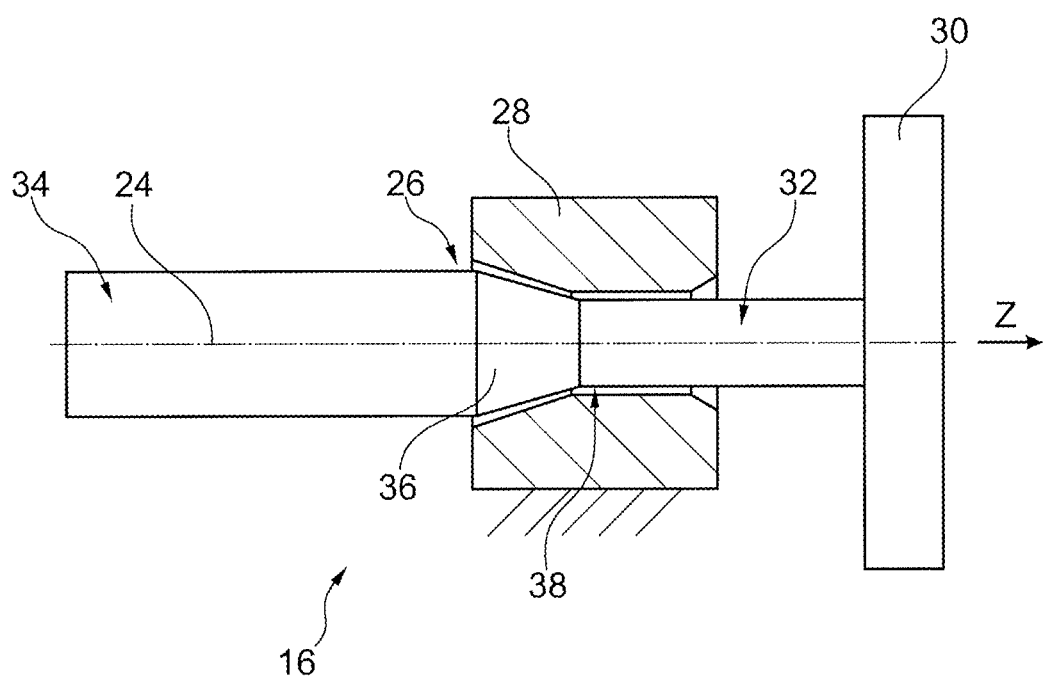
FIG. 2 shows a schematic representation of an energy absorption device according to a first embodiment, included in the steering column assembly according to the invention.

FIG. 2 shows a first embodiment of the energy absorption device 16 as a schematic representation. An entirely linear absorption part 24 having the form of a rod, tube or wire extends parallel to the sleeve element 14, and passes into a reduction part 28 through a passage 26 having the form of a through-hole, and is fixed to a support member 30. The non-actuated initial position before a vehicle crash is shown. The absorption part 24 has a passive portion 32 with a smaller cross-section, beginning at the fastening end on the support member 30 and extending up to the passage 26 and it also has an end portion 34 with a larger cross-section located at the opposite end as well as a conical tapered transition portion 36 connecting the portions 32 and 34. The passage 26 is narrowed from the end portion 34 starting at a conical area, for example, to reach then a narrowest point 38, which defines the cross-section of the passage 26. The cross-section of the passive portion 32 is smaller in cross-section than the passage 26 at the narrowest point 38.

In the illustrated embodiment, which is not to be understood as limiting, the support member 30 is fastened to the sleeve element 14 or may be coupled to it, whereas the reduction part 28 is fixed to the vehicle, preferably attached to the mounting element 12. In the event of a vehicle crash, the sleeve element 14 together with the support member 30 is moved by the impacting passenger in the direction Z according to FIG. 1. Thus a tensile force is applied to the absorption part 24, and the end portion 34 whose cross-section is larger than that of the passage 26 at the narrowest point 38, is at least partially pulled through the passage 26, and in the course of this, it is plastically deformed to a smaller diameter. In this way, energy is absorbed. Of course, vice versa, it would also be possible to connect the reduction part 28 to the sleeve element 14, and to keep the support member 30 stationary. Then, the same relative movement between the two parts would occur. The reduction part 28 is preferably made of a harder material than the absorption part 24, at least in the area of the passage 26. In addition, coatings may also be provided for one or both parts. In the deformation zone itself, there is a tension-compression stress. The technical forming mechanism underlying this invention corresponds to the method of wire drawing.

Figure 3:
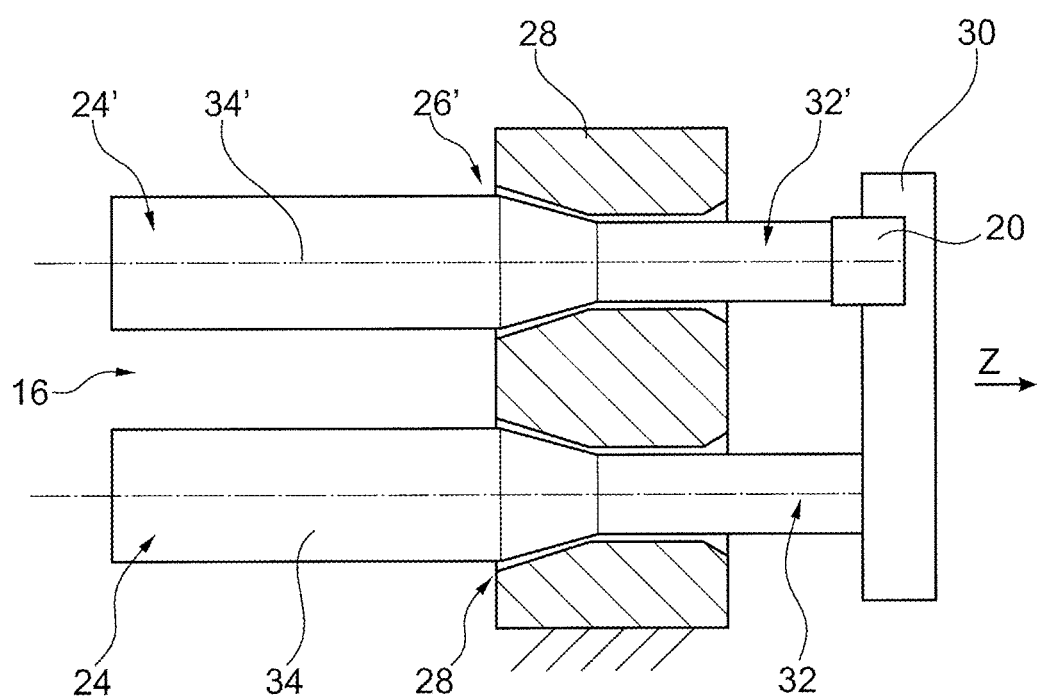
FIG. 3 shows a schematic representation of an energy absorption device according to a second embodiment.

FIG. 3 shows a schematic representation of an energy absorption device 16, which may be switched between two different high energy absorption levels depending on the vehicle crash. A first energy absorption requirement is present in a vehicle crash, in which less energy is converted by plastic deformation compared to a second energy absorption requirement. A controller is connected to sensors and determines which energy absorption requirement is present.

In addition to the absorption part 24, as shown in FIG. 2, a second parallel absorption part 24' is present, which extends through a separate passage 26' until reaching the support member 30. The passage 26' is provided in the same reduction part 28 as the passage 26, wherein optionally two separate reduction parts could be provided here. In the illustrated embodiment, the absorption parts 24, 24' as well as the passages 26, 26' are formed identically to one another. A different embodiment of the absorption parts 24 and 24' and the passages 26 and 26' is also possible. Between the support member 30 and the absorption part 24' is provided a coupling device 20, which only activates the absorption part 24', i.e. with the support member 30 coupled, when a higher, second energy absorption requirement is present. Only then both absorption parts 24, 24' are pulled through their passages 26, 26', whereby a larger energy is converted into a plastic deformation compared to a first, lower energy absorption requirement.

The corresponding drive of the coupling device 20 is, for example, a pyrotechnic drive that may move a connecting part (not shown) between the support member 30 and the passive portion 32' in order to mechanically couple the support member 30 with the passive portion 32'. Of course, the initial position may also be selected so that at the beginning both absorption parts 24, 24' are active and in the presence of the first energy absorption requirement, the absorption part 24' is uncoupled from the support member 30. Consequently, the present invention is generally not limited to which absorption parts are or are not active in the initial position.

Figure 4A:
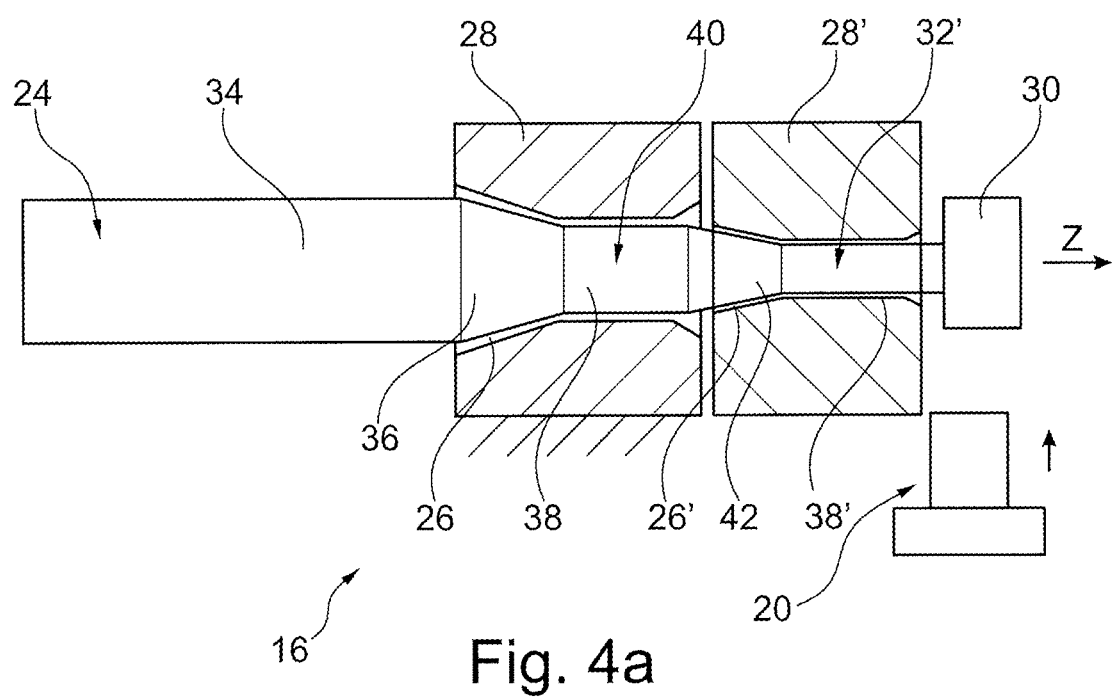
FIG. 4a shows a schematic representation of an energy absorption device according to a third embodiment in an initial state.
Figure 4B:
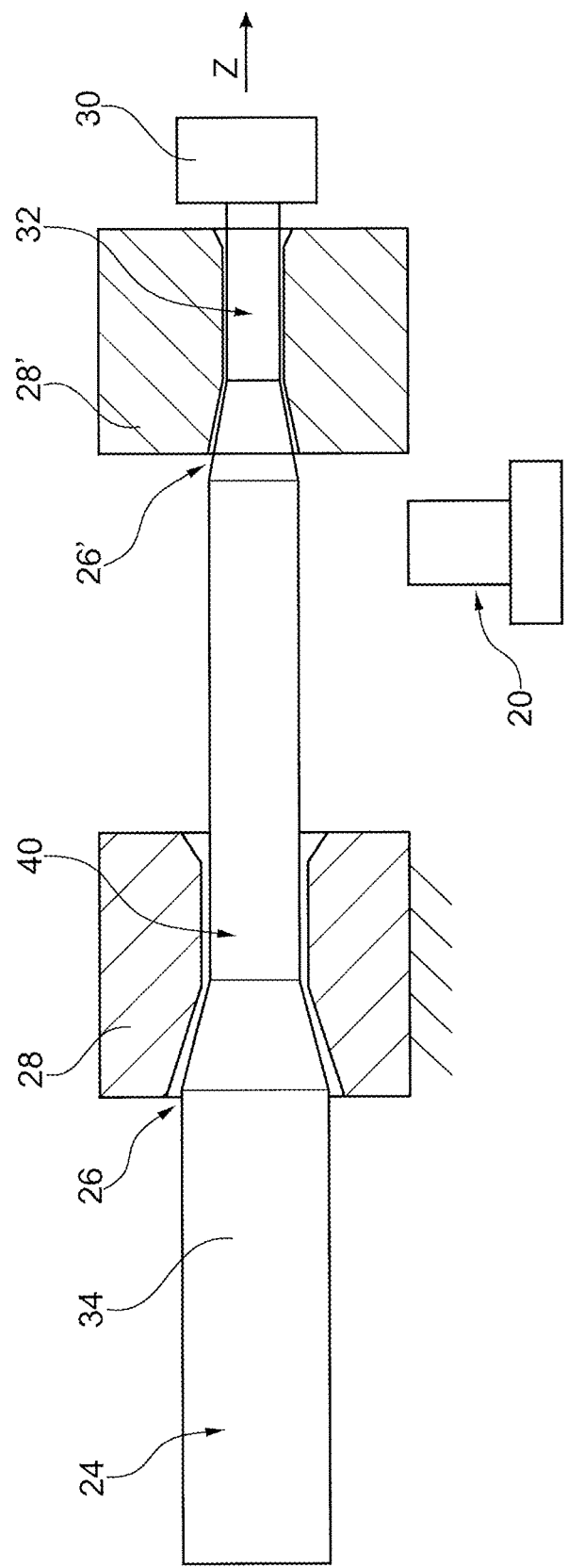
FIG. 4b shows a schematic representation of the energy absorption device according to the third embodiment in the event of a low force requirement or energy absorption requirement.

Another energy absorption device 16 is shown in FIGS. 4a to 4c. Again, the energy absorption device 16 may be switched between a first and a second energy absorption requirement. Here, however, only one absorption part 24 is required, since two successively arranged reduction parts 28, 28' with associated passages 26, 26' are present, through which the absorption part 24 extends until reaching the support member 30.

The absorption part 24 is narrowed over two stages, starting from the end portion 34, over the transition portion 36 up to a central portion 40, which in cross-section is located in the region of the narrowest point 38 of the passage 26, and in cross-section is smaller than the narrowest point 38. From the central portion 40 a second transition portion 42 begins, in which the cross-section is again reduced in order to pass into the passive portion 32. The cross-section of the central portion 40 is larger than that of the passage 26' at its narrowest point 38', and the cross-section of the end portion 34, in turn, is larger than that of the narrowest point 38. The coupling device 20 equipped with a drive (symbolized by an arrow) ensures that the second reduction part 28' is optionally engageable.

In the embodiment shown in FIG. 4a, the reduction part 28' is not fixed to the vehicle, because the coupling device 20 acting as a stop and coupled to the mounting element 12 is not in the movement path of the reduction part 28'. Thus, when the support member 30 is moved in the direction Z in the event of a vehicle crash, the reduction part 28' is moved along and does not operate. Only the passage 26 operates, while plastically transforming the end portion 34 and decreasing in cross section. This is illustrated in FIG. 4b.

In the event of a second energy absorption requirement, the coupling device 20 is displaced in the movement path of the reduction part 28' before the absorption part 24 moves, as shown in FIG. 4c. In this case, while the absorption part 24 is being displaced, the reduction part 28' remains fixed to the vehicle, and contributes to the energy conversion.

Figure 5:
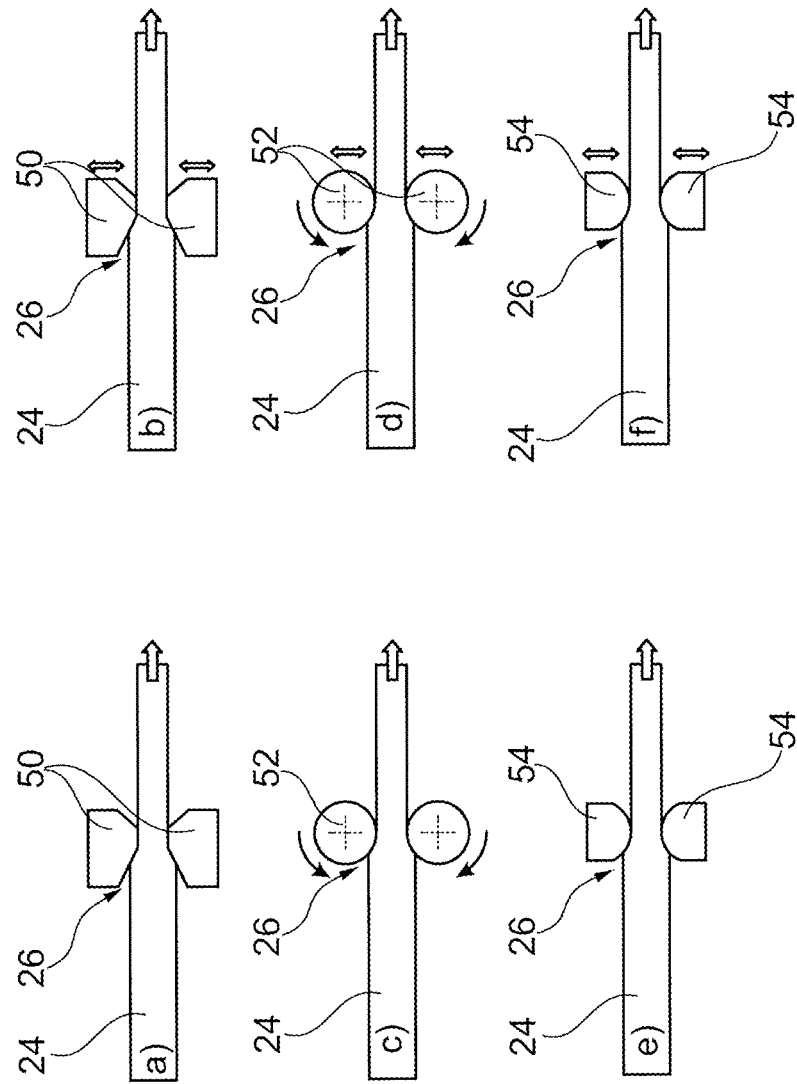
FIG. 5a shows a first embodiment of the reduction part of the energy absorption device.
FIG. 5b shows a second embodiment of the reduction part of the energy absorption device.
FIG. 5c shows a third embodiment of the reduction part of the energy absorption device.
FIG. 5d shows a fourth embodiment of the reduction part of the energy absorption device.
FIG. 5e shows a fifth embodiment of the reduction part of the energy absorption device.
FIG. 5f shows a sixth embodiment of the reduction part of the energy absorption device.

In FIGS. 5a to 5f different variants of the passage 26, 26' are shown. In particular, it is clear that the increasing narrowing of the passage must be formed not only by a rigid opening, the border of which is completely surrounding the passage 26, 26'. In FIG. 5a, two opposing jaws 50 of a reduction part are shown, for example, so that here the absorption part 24 is not deformed over the entire circumference but only at two opposite edges. Here it could be provided, for example, an absorption part 24 with a rectangular cross-section.

In the embodiment of FIG. 5c, two rollers 52 (or a plurality of paired rollers) are opposite each other, between which the absorption part 24 passes through and is deformed plastically. This allows friction to be minimized, and the deformation progression may be more accurately predetermined.

In FIG. 5e, in cross-section two semi-circular jaws 54 are shown, between which the absorption part 24 is moved along to be deformed.

The FIGS. 5b, 5d and 5f are variants of FIGS. 5a, 5c and 5e, respectively, since the rollers 52 or jaws 54 are mutually adjustable towards and away from each other, by means of which the cross-section of the passage may be adjusted via a drive. Thus, the amount of energy to be converted may also be varied.

Figure 6:
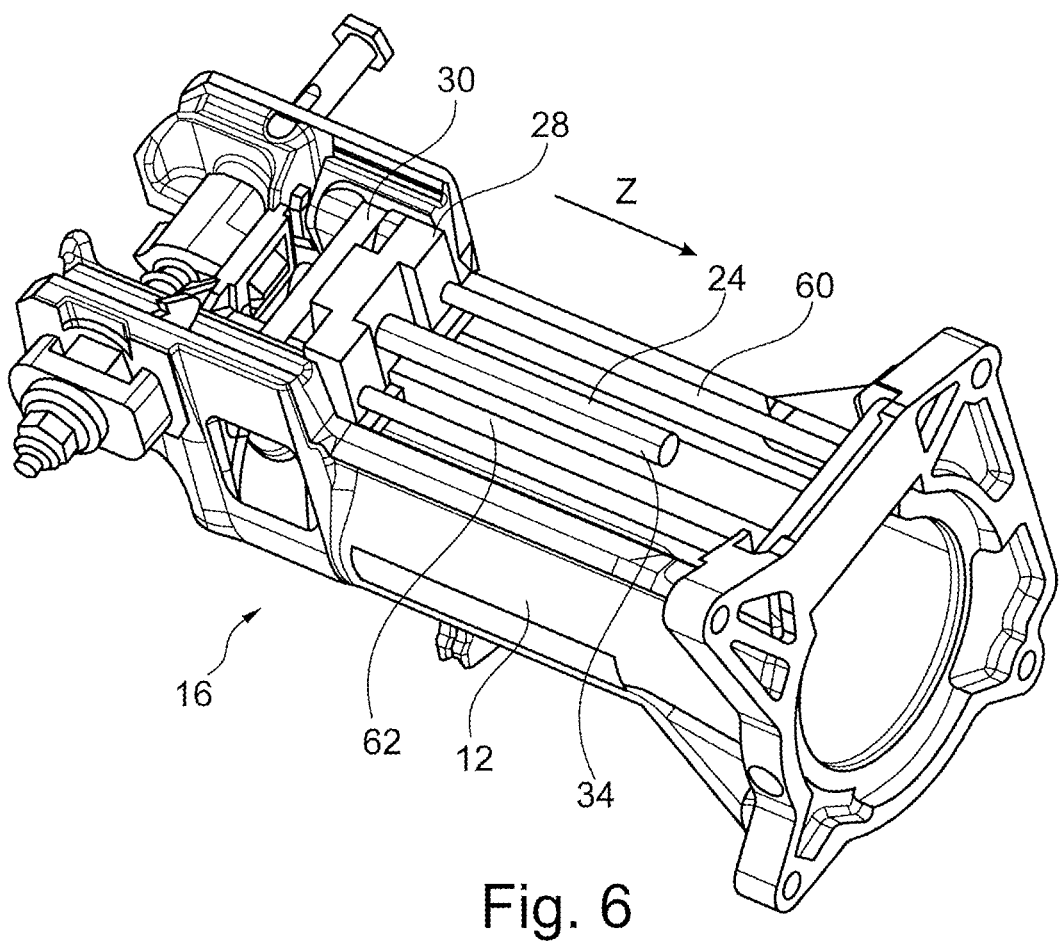
FIG. 6 shows a schematic representation of a further energy absorption device for the steering column assembly according to the invention with only one energy absorption level.

FIG. 6 shows a further embodiment of the energy absorption device 16. In this case, the mounting element 12 is represented, which receives the sleeve element (not shown). The mounting element 12 has a linear guidance 60 on the outside, here consisting of two parallel rods, between which the absorption part 24, similar to FIG. 2, is located. The support member 30 is also fixedly coupled to the mounting element 12. The mounting element 12 has an elongated slit 62. In this area the sleeve element 14 is coupled to the reduction part 28. In this case, the absorption part 24 is stationary, whereas the sleeve element movable in the direction of arrow Z entrains the reduction part 28 while moving it along the absorption part 24 to be plastically deformed. Again, the free end of the end portion 34 is cantilevered, it must not be mounted. Here, as described above and below in the embodiments, the absorption part 24 is subjected to tensile stresses while being plastically deformed.

Figure 7:
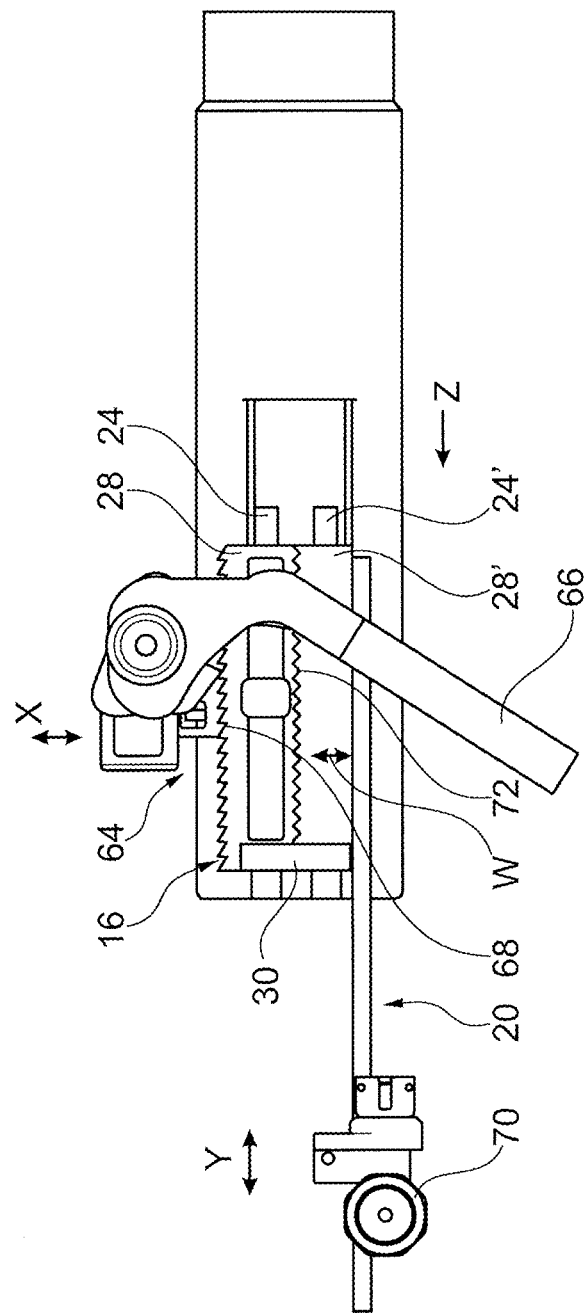
FIG. 7 shows a schematic longitudinal sectional view through a further embodiment of the energy absorption device included in the steering column assembly according to the invention, comprising two absorption parts and one mechanical steering column adjustment in the second engaged absorption part.
Figure 8:
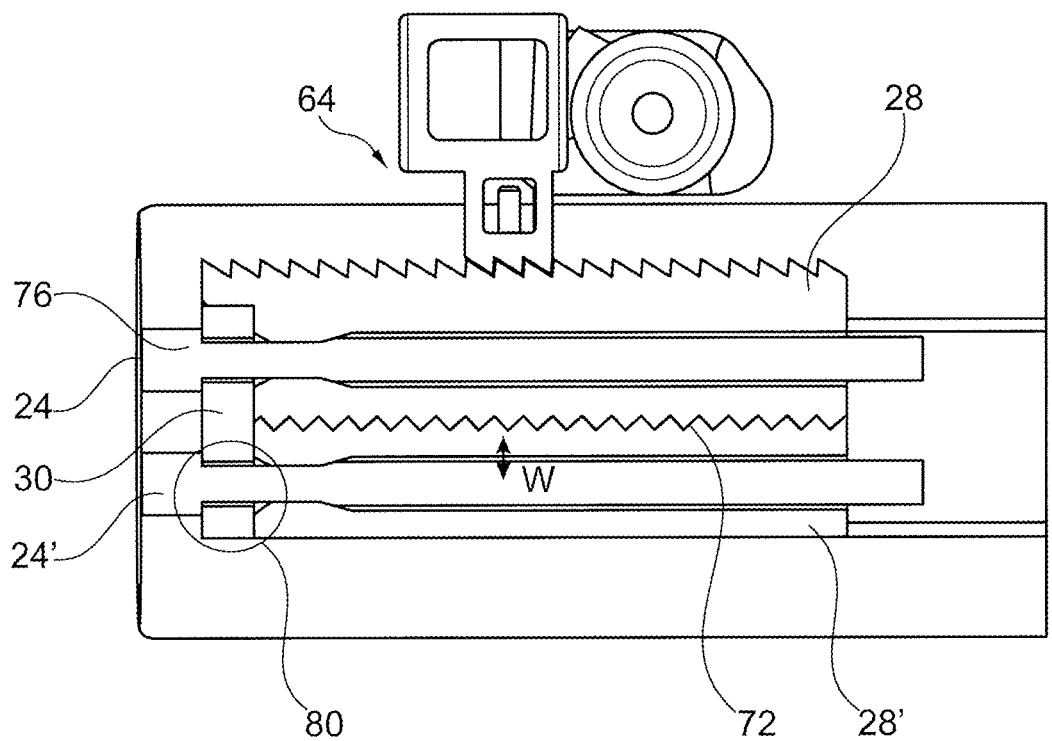
FIG. 8 shows the energy absorption device according to FIG. 7 with an enlarged view of the second engaged absorption part.
Figure 9:
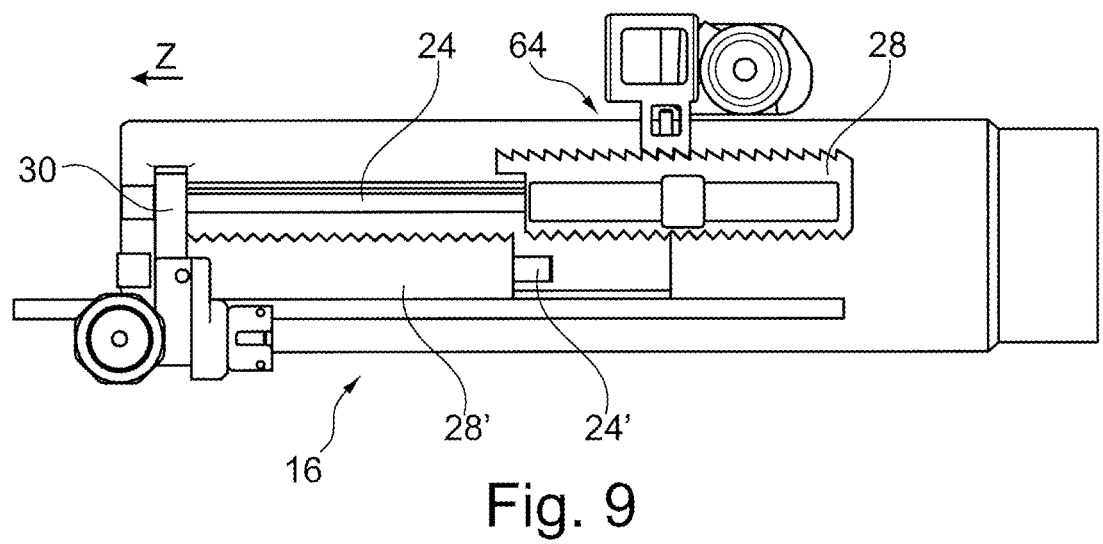
FIG. 9 shows the energy absorption device of FIG. 7 after a vehicle crash, wherein only the first absorption part was engaged.

FIGS. 7-9 show that the steering column assembly may also be combined very easily with a steering column adjustment to adjust the position of the steering wheel. A locking mechanism 64 having a lever 66 ensures that in an unlocking position the energy absorption device 16 may be moved along the spindle axis together with the steering shaft and the sleeve element 14 coupled to it. The lever 66 is attached to the mounting element 12. In the locking position, which is shown in FIG. 7, a movable locking part 68 engages positively with the reduction part 28 via the lever 66 in the direction of the double arrow X, transverse to the displacement direction Y. For this purpose the locking part 68 has a toothing and the reduction part 28 has a corresponding counter-toothing, which are engaged with each other only in the locking position. Since the reduction part 28 is fixedly coupled to the mounting element 12 in the locking position via the locking part 68, said reduction part 28 may not be moved as a consequence of a vehicle crash. The absorption part 24 is attached to the support member 30, which in turn is fixedly coupled to the sleeve element 14. Another absorption part 24', as in FIG. 3, is also attached to the support member 30 and extends parallel to the absorption part 24. For the absorption part 24' that is only engaged in the event of a second energy absorption requirement, a pyrotechnic drive 70 of the coupling device 20 and a separate reduction part 28' are provided.

The drive 70 allows to move the reduction part 28' in the direction of arrow W transverse to the direction Z towards the reduction part 28, while mechanically coupling both parts. For this purpose, tooth systems 72 are provided between the reduction parts 28, 28'.

In FIG. 7, the reduction parts 28, 28' are coupled together. In the case of a high energy absorption requirement, the sleeve element 14 moves the support member 30 in the direction Z, and thus pulls both absorption parts 24, 24' through their associated passages into their reduction parts 28, 28'.

FIG. 8 shows the reduction parts 28, 28' in the coupled state in which the tooth systems 72 are engaged. The absorption parts 24, 24' pass into corresponding openings in the support member 30, and have a thickening 76 at the opposite end, which are generated, for example, by forming or applying a bearing component. In order that both the absorption part 24' and its reduction part 28' may laterally move in the direction of arrow W, the support member 30 has a longer slotted hole 80 in the direction of W. This is described with a circle.

FIG. 9 shows the energy absorption device 16 of FIGS. 7 and 8 in the actuated state, when only a first lower energy absorption requirement is present. Here, only the reduction part 28 is fixed to the vehicle, and thus only the absorption part 24 is responsible for the energy absorption. The reduction part 28' moves with the absorption part 24' in the direction Z.

Figure 10:
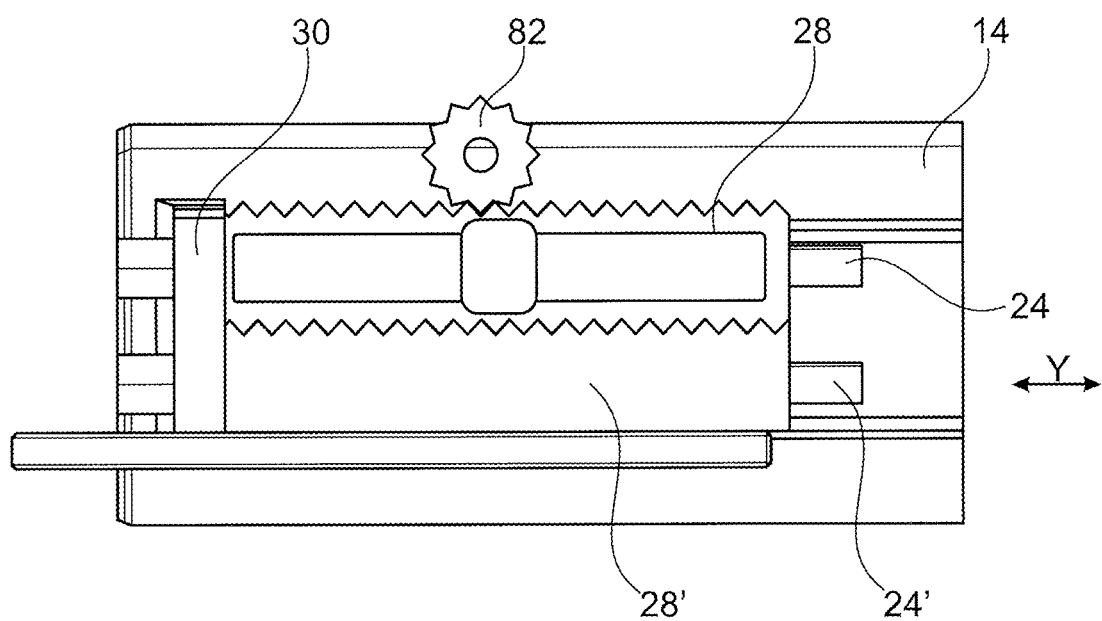
FIG. 10 shows an energy absorption device for the steering column assembly according to the invention with an electric steering column adjustment.

FIG. 10 shows an embodiment that is constructed according to FIGS. 7-9, in a manner that for this purpose as in all other embodiments, the same reference numerals indicate identical or functionally identical parts. Instead of a manual steering column adjustment, an electric steering column adjustment is provided here, comprising a drive wheel 82, in this case a gear, which is coupled to an electric motor (not shown) and is positively engaged with the reduction part 28 in order to be able to move it in the adjustment direction Y. In addition, a further locking is provided in the case of a vehicle crash, which prevents that the drive wheel 82 and the reduction part 28 be moved when a force is exerted on them via the sleeve element 14.

Figure 11:
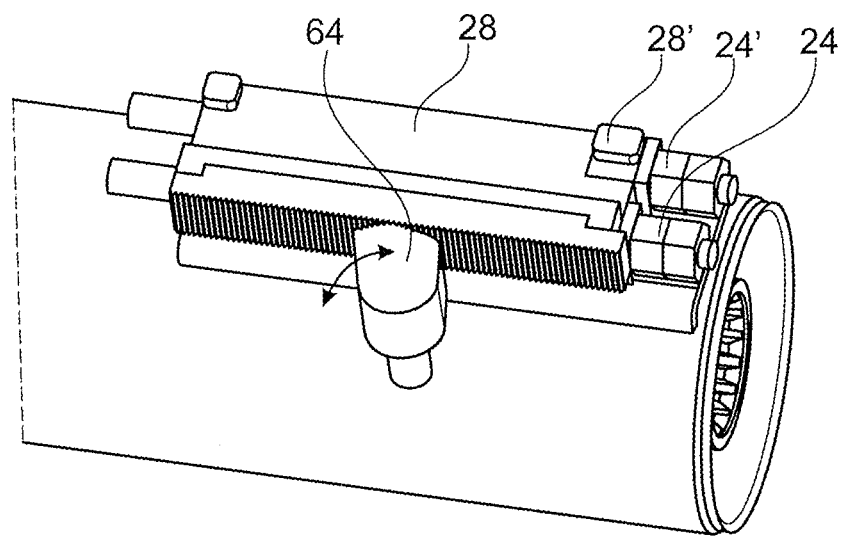
FIG. 11 shows a further energy absorption device for the steering column assembly according to the invention, wherein a provided coupling device is omitted for the sake of comprehension.
Figure 12:
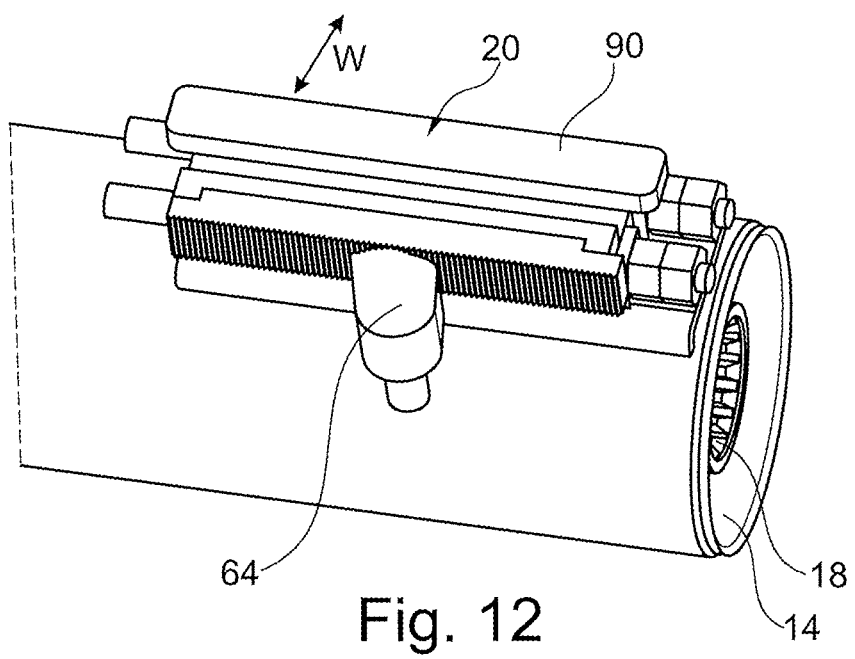
FIG. 12 shows the energy absorption device according to FIG. 11 with the coupling device.

In the case of the embodiment of FIGS. 11 and 12, the coupling device 20 is not provided to move the reduction part 28' as shown in FIG. 10 laterally towards the reduction part 28, but an intermediate element 90 is provided, which, like a bridge, may couple the reduction parts 28, 28' to each other, as shown in FIG. 12. The initial position is such that both reduction parts 28, 28' are coupled to each other. If in the case of a vehicle crash with a lower energy absorption requirement, then the intermediate element 90 is moved by the coupling device 20 in the direction of arrow W, so that the reduction parts 28, 28' are uncoupled from each other. Also in this embodiment, a steering column adjustment may be provided, as in the FIGS. 7-10. For this reason, the locking mechanism 64 is shown, which may be moved towards the reduction part 28 to lock it mechanically.

Figure 13:
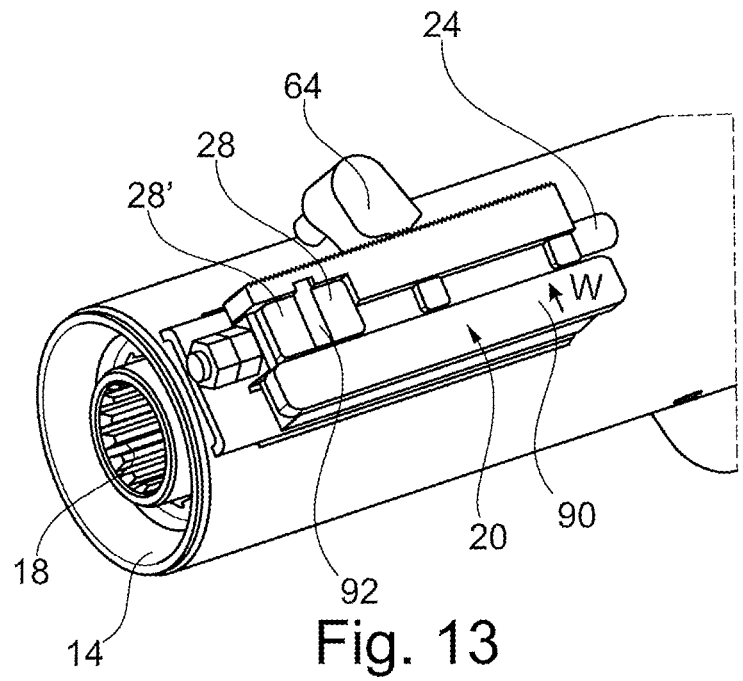
FIG. 13 shows a further embodiment with one absorption element and two deformation elements, and one coupling device.
Figure 14:
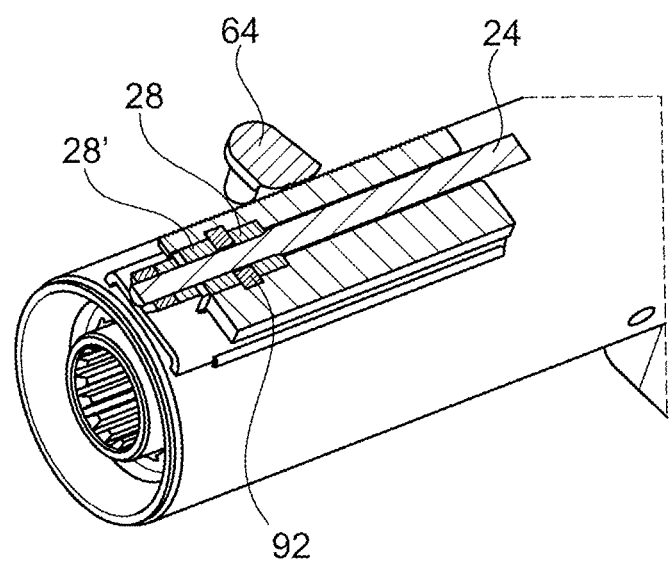
FIG. 14 shows the embodiment of FIG. 13 with a sectional view on the central axis of the absorption element.

The embodiment according to FIGS. 13 and 14 comprises two successively arranged reduction parts 28, 28', through whose passages the same absorption part 24 extends. The reduction part 28 is always in operational engagement, while the front reduction part 28' may be engaged or disengaged by means of a laterally displaceable coupling device 20. The coupling device 20 here, similarly as in FIG. 12, has an intermediate element 90, which may be displaced from the uncoupled position according to FIG. 13 via the reduction parts 28, 28' in order to couple said parts to each other, in a manner that the reduction part 28' in a relative movement respect to the absorption part 24 remains coupled to the reduction part 28. A plug fixing member 92 holds the reduction part 28 in position. In this way, the assembly of the reduction parts 28, 28' is very simple and the reduction parts 28, 28' are very easy to change. The invention also relates to a steering column assembly according to the inverted tube-in-tube concept. In this way the mounting element 12 in FIG. 1 would be only one tube partially extending into the sleeve element 14. However, the relative movement between the mounting element and the sleeve element is still present.

FIG. 15 shows the energy absorption device with a standard tube-in-tube concept. Here, a clamping unit 100 is provided, which has an upper plate 102 with preferably 2 parallel one-piece webs 104, projecting downwardly from the underside, between which the sleeve element 14 and the steering shaft therein 18 are received.

The webs are movable towards each other by means of a conventional quick-action clamping device, which extends, for example, through windows 106 into the webs 102. When the webs 102 are pressed towards each other, the sleeve element 14 is damped. The plate 102 has protruding portions 108 extending in opposite directions laterally with respect to the webs, and has these 2 slits 112 extending in the direction Z starting from a front edge 110. A mounting element 12 extends through each slit 112, the mounting element having a head 114 on the top of the plate 112 and a neck portion extending through the slit 112 and a lower portion simultaneously forming the support member 30. The support member 30 may be constructed separately from the neck section and/or the head 114 or, as shown in FIG. 16, may be integrated as one piece into the mounting element 12.

In the present case, but not limited to this embodiment, a mounting opening 116 extends through the support member 30, the neck portion and the head 112, through which a screw may extend for fixing the clamping unit 100 on a vehicle-fixed part, or on an intermediate fixing element, such as, for example, a mounting plate. Thus, the clamping unit 100 is located on the support member 30 while driving normally. The absorption parts 24, which may be constructed as described above, are attached to the two support members 30 and extend through an associated reduction part 28, which is located at an associated angled flap 118 of the plate 102 (see also FIG. 17).

Figure 19:
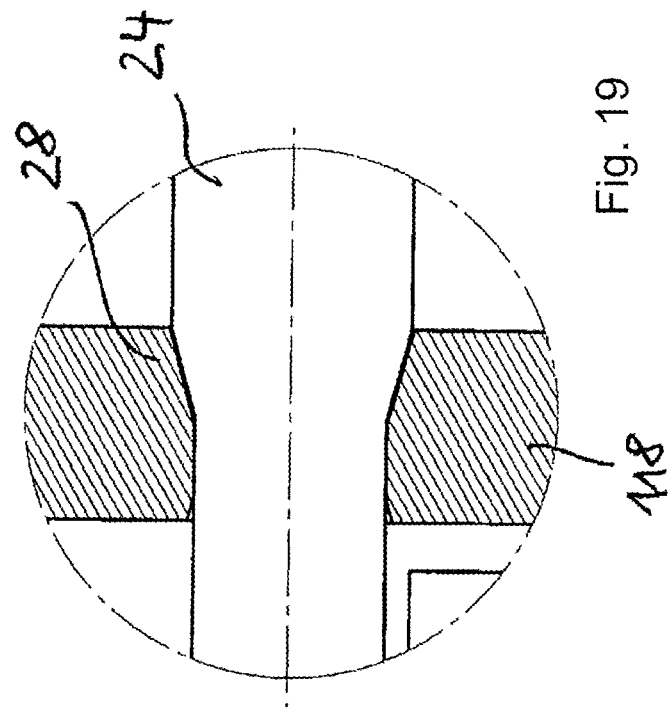
FIG. 19 shows an enlarged view of the area designated with B, framed in FIG. 18.
Figure 18:
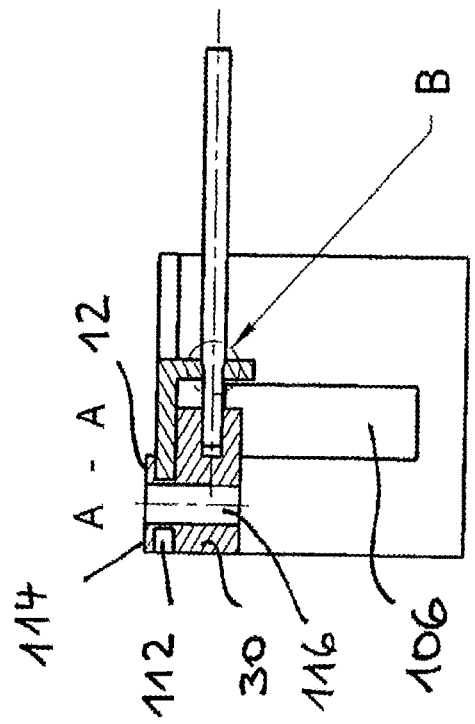
FIG. 18 shows a variant of the clamping unit of FIG. 15 with an integrated reduction part in one piece.

The embodiment according to FIGS. 18 and 19 differs from that according to the FIGS. 15-17 in that the reduction parts 28 are integrated as one piece into the flap 118, so that the flaps may be considered as reduction parts, which then become a one-piece component of the plate 102. In the event of a crash, the sleeve element 12 is moved together with the clamping unit 100 in the Z direction. Here, the reduction parts 28 move along their absorption part 24, as previously explained with reference to other embodiments. After a certain distance traveled by the clamping unit, this one becomes disengaged from the mounting element 12, as soon as the slits 112 come out or disengage from the mounting elements 12. In the following movement, the damping unit 100 is guided and mounted by fasteners (not shown).

Of course, vice versa, the reduction part 28 may also be fixed and the absorption part 24 may be moved in the event of a crash. Then, the absorption part 24 is connected to the clamping unit 100 via a support member 30 that is located where the reduction part 28 is located in FIG. 16. Here, one end of the absorption part 24 is fixedly attached to the plate 102. The support member according to FIG. 16 is then used for the reduction part and has a tapered opening through which the absorption part 24 extends to the left.

The invention claimed is:

1. A steering column assembly for a vehicle, comprising:
a vehicle-fixed mounting element and a sleeve element mounted thereon, with a steering shaft extending through the sleeve element,
an energy absorption device coupled to the mounting element and the sleeve element, the energy absorption device having at least one elongate absorption part and at least one reduction part with a passage for the absorption part, through which the absorption part extends, and wherein said passage has a smaller cross-section than an end portion of the absorption part, and
an electric steering column adjustment configured to directly push the reduction part, and as a result of this, also push the sleeve element,
wherein in the event of a vehicle crash, at least the absorption part is fixedly coupled to either the mounting element or the sleeve element, while the reduction part is fixedly coupled to the other of the two elements,
wherein in the event of the vehicle crash the mounting element and the sleeve element are coupled to each other in a longitudinally displaceable manner, so that a relative longitudinal movement between the absorption part and the reduction part may take place, wherein due to the longitudinal movement and due to an applied tensile force to the absorption part, the end portion is plastically deformed in cross-section through the smaller passage in cross-section.

2. The steering column assembly according to claim 1, characterized in that at least the end portion of the absorption part extends exclusively linearly in the direction of the longitudinal movement.

3. The steering column assembly according to claim 1, characterized in that the passage is formed by one entirely closed matrix or a plurality of projections which are extending in a central axis direction of the absorption part or rollers, wherein the matrices abut only against peripheral portions or against the entire outer circumference of the absorption part, and the projections or rollers abut only against peripheral portions of the absorption part.

4. The steering column assembly according to claim 1, characterized in that the passage is narrowed in the direction of movement laterally to the absorption part, seen in the direction of its retaining portion opposing the end portion.

5. The steering column assembly according to claim 1, characterized in that the absorption part in the initial state, before the vehicle crash, has a cross-section from a support end opposing the end portion at least up to the passage, said cross-section allowing movement through the passage without plastic deformation of the absorption part.

6. The steering column assembly according to claim 1, characterized in that the at least one absorption part and at least two passages as well as one coupling device is provided, wherein the coupling device is designed in a manner that in the event of a first energy absorption requirement, only a first passage is movable relative to an associated absorption part in order to absorb energy, and that in the event of a second higher energy absorption requirement a second passage is movable relative to an associated absorption part in order to absorb energy, the absorption part associated with the first passage and the associated absorption part associated with the second passage being the same absorption part or two separate absorption parts.

7. The steering column assembly according to claim 6, characterized in that the coupling device is designed in a manner that if the first passage absorbs additional energy, also in the event of the second energy absorption requirement said coupling device is movable relative to the associated absorption part.

8. The steering column assembly according to claim 6, characterized in that a plurality of first absorption parts are provided, said absorption parts having identical or different cross-section and material, which are associated with first passages having identical or different cross-section.

9. The steering column assembly according to claim 6, characterized in that at least one absorption part extends through at least two passages, one of the passages being close to the end portion and one of passages being remote from the end portion, wherein the passage close to the end portion has a smaller cross-section than the remote passage, wherein the remote passage in the vehicle crash, at least in the event of a sufficiently high energy absorption requirement, pulls a portion of the absorption part to a even smaller cross-section during the relative movement between the absorption part and the passages, and wherein said portion was previously deformed by the passage closer to the end portion.

10. The steering column assembly according to claim 9, characterized in that one of the two passages associated to the same absorption part may be functionally engaged or disengaged by means of a coupling device only in the event of a predetermined energy absorption requirement.

11. The steering column assembly according to claim 6, characterized in that the coupling device comprises a drive for connecting the second passage.

12. The steering column assembly according to claim 6, characterized in that the coupling device is connected to a second reduction part having the second passage, and either in the event of the first energy absorption requirement, the first and the second reduction part are mechanically uncoupled from each other, or in the event of the second energy absorption requirement, the first and the second reduction part are mechanically coupled to each other.

13. The steering column assembly according to claim 1, characterized in that for a steering column adjustment a vehicle-fixed locking mechanism is provided, which can assume a locking position and an unlocking position, wherein in the unlocking position the energy absorption device together with the steering shaft is displaceable, and in the locking position the locking mechanism secures at least one reduction part or at least one absorption part fixedly to the vehicle.

14. The steering column assembly according to claim 1, characterized in that all the absorption parts are parallel to each other and/or secured to a longitudinal end of the same support member.

15. The steering column assembly according to claim 1, characterized in that the absorption parts are parallel to the steering shaft.

16. The steering column assembly according to claim 1, characterized in that the at least one absorption part is a rod or a wire-like object.

17. The steering column assembly according to claim 1, characterized in that the at least one reduction part is fixedly coupled to the sleeve element, and the at least one absorption part is fixedly coupled to the mounting element in a manner that in the event of the vehicle crash the reduction part is moved at least along one stationary absorption part while the absorption part is plastically deformed in cross-section.

18. The steering column assembly according to claim 1, characterized in that the energy absorption device is positioned on the outside of the mounting element.

19. A steering column assembly for a vehicle, comprising:
a vehicle-fixed mounting element having a sleeve element mounted thereon, a steering shaft extending through the sleeve element,
an energy absorption device coupled to the mounting element and the sleeve element, the energy absorption device having an elongate absorption part and a reduction part with a passage through which the absorption part extends, the absorption part having a first portion with a smaller cross-section than the passage and a second portion with a larger cross-section than the passage, the smaller cross-section of the first portion permitting the first portion to pass longitudinally into the passage without plastic deformation of the absorption part, and
an electric steering column adjustment configured to directly push the reduction part, and as a result of this, also push the sleeve element,
wherein in the event of a vehicle crash, the absorption part is fixedly coupled to one of the mounting element and sleeve element, while the reduction part is fixedly coupled to the other of the mounting element and sleeve element,
wherein in the event of the vehicle crash, the mounting element and the sleeve element are coupled to each other in a longitudinally displaceable manner, so that a relative longitudinal movement between the absorption part and the reduction part may take place, wherein due to the longitudinal movement and due to an applied tensile force to the absorption part, the second portion is plastically deformed in cross-section through the smaller passage in cross-section.

20. The steering column assembly according to claim 19, characterized in that the sleeve element is received in a releasable and lockable clamping unit and in the released state is adjustable relative to the clamping unit, wherein the sleeve element is mounted on the mounting element via the clamping unit.

21. A steering column assembly for a vehicle, comprising:
a vehicle-fixed mounting element having a sleeve element mounted thereon, a steering shaft extending through the sleeve element,
an energy absorption device coupled to the mounting element and the sleeve element, the energy absorption device having an elongate absorption part and a reduction part with a passage through which the absorption part extends, the passage having a smaller cross-section than an end portion of the absorption part, the absorption part being at least one of circular in cross-section, a tube, and a wire,
wherein in the event of a vehicle crash, the absorption part is fixedly coupled to one of the mounting element and sleeve element, while the reduction part is fixedly coupled to the other of the mounting element and sleeve element,
wherein in the event of the vehicle crash, the mounting element and the sleeve element are coupled to each other in a longitudinally displaceable manner, so that a relative longitudinal movement between the absorption part and the reduction part may take place, wherein due to the longitudinal movement and due to an applied tensile force to the absorption part, the end portion is plastically deformed in cross-section through the smaller passage in cross-section.

22. The steering column assembly according to claim 21, characterized in that the sleeve element is received in a releasable and lockable clamping unit and in the released state is adjustable relative to the clamping unit, wherein the sleeve element is mounted on the mounting element via the clamping unit.

23. A steering column assembly for a vehicle, comprising:
a vehicle-fixed mounting element and a sleeve element mounted thereon, with a steering shaft extending through the sleeve element;
an energy absorption device coupled to the mounting element and the sleeve element, the energy absorption device having at least one elongate absorption part and at least one reduction part with a passage for the absorption part, through which the absorption part extends, and wherein said passage has a smaller cross-section than an end portion of the absorption part;
a vehicle-fixed locking mechanism for a steering column adjustment, the locking mechanism being configured to assume a locking position and an unlocking position, the energy absorption device together with the steering shaft being displaceable when the locking mechanism is in the unlocking position, the locking mechanism securing the at least one reduction part or the at least one absorption part fixedly to the vehicle when in the locking position;
wherein in the event of a vehicle crash, at least the absorption part is fixedly coupled to either the mounting element or the sleeve element, while the reduction part is fixedly coupled to the other of the two elements,
wherein in the event of the vehicle crash the mounting element and the sleeve element are coupled to each other in a longitudinally displaceable manner, so that a relative longitudinal movement between the absorption part and the reduction part may take place, wherein due to the longitudinal movement and due to an applied tensile force to the absorption part, the end portion is plastically deformed in cross-section through the smaller passage in cross-section.

\* \* \* \* \*